(12) United States Patent
Aimone (10) Patent No.: US 11,867,945 B2
(45) Date of Patent: Jan. 9, 2024

(54) OPTICAL WAVEGUIDE CIRCUITS HAVING LATERALLY TILTED WAVEGUIDE CORES

(71) Applicant: Nokia Solutions and Networks OY, Espoo (FI)

(72) Inventor: Alessandro Aimone, Berlin (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/712,909

(22) Filed: Apr. 4, 2022

(65) Prior Publication Data

US 2022/0350078 A1 Nov. 3, 2022

(30) Foreign Application Priority Data

Apr. 30, 2021 (EP) ..................................... 21305558

(51) Int. Cl.
*G02B 6/12* (2006.01)
*G02B 6/126* (2006.01)

(52) U.S. Cl.
CPC ......... *G02B 6/12004* (2013.01); *G02B 6/126* (2013.01); *G02B 2006/12097* (2013.01); *G02B 2006/12128* (2013.01)

(58) Field of Classification Search
CPC ................ G02B 6/12004; G02B 6/126; G02B 2006/12097; G02B 2006/12128
USPC .......................................................... 385/14
See application file for complete search history.

(56) References Cited

U.S. PATENT DOCUMENTS

| 8,107,508 B2 | 1/2012 | Oh et al. |
| 8,149,891 B2 | 4/2012 | Funabashi |
| 10,036,851 B1 * | 7/2018 | Peng ..................... G11B 5/6088 |
| 10,191,214 B2 | 1/2019 | Dong |

(Continued)

FOREIGN PATENT DOCUMENTS

| CN | 101320113 B | 6/2010 |
| JP | 2010-88110 A | 4/2010 |

(Continued)

OTHER PUBLICATIONS

Extended European Search Report for corresponding European application No. 21305558.5; dated Jan. 26, 2022 (12 pages).

(Continued)

*Primary Examiner* — Jerry M Blevins
(74) *Attorney, Agent, or Firm* — Mendelsohn Dunleavy, P.C.; Steve Mendelsohn (57) ABSTRACT

A photonic integrated circuit (PIC) in which some optical waveguides have laterally tilted waveguide cores used to implement passive polarization-handling circuit elements, e.g., suitable for processing polarization-division-multiplexed optical communication signals. Different sections of such waveguide cores may have continuously varying or fixed lateral tilt angles. Different polarization-handling circuit elements can be realized, e.g., using different combinations of end-connected untilted and laterally tilted waveguide-core sections. In some embodiments, laterally tilted waveguide cores may incorporate multiple-quantum-well structures and be used to implement active circuit elements. At least some embodiments beneficially lend themselves to highly reproducible fabrication processes, which can advantageously be used to achieve a relatively high yield of the corresponding PICs during manufacture.

20 Claims, 6 Drawing Sheets

(56) References Cited

U.S. PATENT DOCUMENTS

| | | | |
|---|---|---|---|
| 2010/0002989 A1* | 1/2010 | Tokushima | G02B 6/1228 385/28 |
| 2011/0158579 A1 | 6/2011 | Little | |
| 2013/0100695 A1* | 4/2013 | Yankov | G02B 6/0035 362/602 |
| 2015/0086219 A1* | 3/2015 | Li | G02B 6/1225 385/14 |
| 2018/0152004 A1 | 5/2018 | Hsu et al. | |
| 2018/0341062 A1 | 11/2018 | Melikyan et al. | |
| 2019/0154917 A1 | 5/2019 | Baier et al. | |
| 2020/0064553 A1 | 2/2020 | Frish | |
| 2020/0096702 A1 | 3/2020 | Dong et al. | |

FOREIGN PATENT DOCUMENTS

| | | |
|---|---|---|
| JP | 2019-57543 A | 4/2019 |
| WO | 00/73838 A1 | 12/2000 |

OTHER PUBLICATIONS

Dzibrou, Dzmitry O., et al. "Tolerant polarization converter for InGaAsP-InP photonic integrated circuits." Optics Letters 38.18 (2013): 3482-3484.

Keyvaninia, Shahram, et al. "Highly efficient passive InP polarization rotator-splitter." Optics Express 27.18 (2019): 25872-25881.

Pello, Josselin, et al. "High-efficiency ultrasmall polarization converter in InP membrane." Optics Letters 37.17 (2012): 3711-3713.

Smit, Meint, et al. "An introduction to InP-based generic integration technology." Semiconductor Science and Technology 29.8, Article 083001 (2014): 1-41.

Soares, Francisco M., et al. "InP-Based Foundry PICs for Optical Interconnects." Applied Sciences 9.8:1588 (2019): 1-16.

Xiong, Yule, et al. "Robust Silicon Waveguide Polarization Rotator With an Amorphous Silicon Overlayer." IEEE Photonics Journal 6.2, Article 2200308 (2014): 1-8.

Notice of Reasons for Refusal for corresponding Japanese application No. 2022-051217; dated Apr. 4, 2023 (52 pages) Machine Translation.

Rahman, B., et al. "Design and Characterization of Compact Single-Section Passive Polarization Rotator." Journal of Lightwave Technology 19.4 (2001): 512-519.

Notice of Reasons for Refusal for corresponding Japanese application No. 2022-051217; dated Sep. 12, 2023 (6 pages) Machine Translation.

* cited by examiner

OPTICAL WAVEGUIDE CIRCUITS HAVING LATERALLY TILTED WAVEGUIDE CORES

BACKGROUND

Field

Various example embodiments relate to optical communication equipment and, more specifically but not exclusively, to photonic integrated circuits (PICs).

Description of the Related Art

This section introduces aspects that may help facilitate a better understanding of the disclosure. Accordingly, the statements of this section are to be read in this light and are not to be understood as admissions about what is in the prior art or what is not in the prior art.

PICs are widely used, e.g., in various elements and components of fiber-optic networks. Some PICs are implemented using material platforms in which the refractive indices of the optical-waveguide core and cladding differ significantly. For such PICs, the transverse electric (TE) and transverse magnetic (TM) polarizations can have a relatively large difference in their group indices, i.e., effective refractive indices. For example, TE and TM polarization modes in representative silicon-based, on-chip waveguides have group indices of about 4.1 and 2.8, respectively. Group-index differences of such magnitude can disadvantageously make it relatively difficult to construct and/or fabricate a functional PIC capable of appropriately handling polarization-division-multiplexed (PDM) optical communication signals.

SUMMARY OF SOME SPECIFIC EMBODIMENTS

Disclosed herein are various embodiments of a PIC in which some optical waveguides have laterally tilted waveguide cores used to implement passive polarization-handling circuit elements, e.g., suitable for processing PDM communication signals. Different sections of such waveguide cores may have continuously varying or fixed lateral tilt angles. Different polarization-handling circuit elements can be realized, e.g., using different combinations of end-connected untilted and laterally tilted waveguide-core sections. In some embodiments, laterally tilted waveguide cores may incorporate multiple-quantum-well (MQW) structures and be used to implement active circuit elements.

At least some embodiments beneficially lend themselves to well-controllable and highly reproducible fabrication processes, which can advantageously be used to achieve a relatively high yield of the corresponding PICs during manufacture.

According to an example embodiment, provided is an apparatus, comprising a photonic integrated circuit that comprises: a substrate having a substantially planar main surface; and an optical waveguide attached to the substrate adjacent and along said main surface, the optical waveguide including a waveguide core; and wherein a first section of the waveguide core has a first edge whereat first and second surfaces of the waveguide core are connected to one another, the first surface being substantially orthogonal to said main surface, the second surface having a nonzero lateral tilt angle with respect to said main surface.

In some embodiments of the above apparatus, the nonzero lateral tilt angle changes continuously along a longitudinal waveguide direction of the first section between a first nonzero tilt-angle value and a different second nonzero tilt-angle value.

In some embodiments of any of the above apparatus, the nonzero lateral tilt angle is greater than 5 degrees but smaller than 60 degrees.

In some embodiments of any of the above apparatus, the first section of the waveguide core has a second edge whereat the first surface and a third surface of the waveguide core are connected to one another, the third surface having the nonzero lateral tilt angle with respect to said main surface.

In some embodiments of any of the above apparatus, the second edge is closer to said main surface than the first edge.

In some embodiments of any of the above apparatus, the first section of the waveguide core has a second edge whereat the first surface and a third surface of the waveguide core are connected to one another, the third surface having a smaller nonzero lateral tilt angle with respect to said main surface than the second surface.

In some embodiments of any of the above apparatus, the first section of the waveguide core has a second edge whereat the first surface and a third surface of the waveguide core are connected to one another, the third surface being parallel to said main surface.

In some embodiments of any of the above apparatus, the first section of the waveguide core comprises a semiconductor diode.

In some embodiments of any of the above apparatus, the first section of the waveguide core comprises a multiple-quantum-well structure having a plurality of semiconductor layers, at least some of said semiconductor layers being parallel to the second surface.

In some embodiments of any of the above apparatus, a second section of the waveguide core is untilted with respect to said main surface, the first and second sections of the waveguide core being end-connected to one another.

In some embodiments of any of the above apparatus, the photonic integrated circuit comprises a polarization splitter-rotator that includes the first and second sections of the waveguide core.

In some embodiments of any of the above apparatus, a second section of the waveguide core has a different nonzero lateral tilt angle, the first and second sections of the waveguide core being end-connected to one another.

In some embodiments of any of the above apparatus, a third section of the waveguide core is untilted with respect to said main surface, the second and third sections of the waveguide core being end-connected to one another.

In some embodiments of any of the above apparatus, a third section of the waveguide core is untilted with respect to said main surface, the first and third sections of the waveguide core being end-connected to one another.

In some embodiments of any of the above apparatus, the photonic integrated circuit comprises a polarization splitter-rotator that includes the first, second, and third sections of the waveguide core.

In some embodiments of any of the above apparatus, the optical waveguide comprises a ridge-waveguide structure attached to the substrate adjacent and along said main surface, the ridge-waveguide structure having first and second sidewalls substantially orthogonal to said main surface, the first sidewall including the first surface.

In some embodiments of any of the above apparatus, the ridge-waveguide structure includes at least a portion of a waveguide cladding, said portion being farther from said main surface than the first section of the waveguide core.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

As used herein, the term "photonic integrated circuit" (or PIC) should be construed to cover planar lightwave circuits (PLCs), integrated optoelectronic devices, wafer-scale products on substrates, individual photonic chips and dies, and hybrid devices. Example material systems that can be used for manufacturing various PICs may include but are not limited to III-V semiconductor materials, silicon photonics (SiP), silica-on-silicon products, silicon-on-insulator (SOI) products, silica-glass-based PLCs, polymer integration platforms, Lithium Niobate and derivatives, nonlinear optical materials, etc. Both packaged devices (e.g., wired-up and/or encapsulated chips) and unpackaged devices (e.g., dies) can be referred to as PICs.

PICs can be used for various applications in the telecommunications, instrumentation, and signal-processing fields. Many of the existing PIC applications are in the sub-fields where the optical-signal reach of under several kilometers or even under several tens of meters is expected.

A PIC typically uses optical waveguides to implement and/or interconnect various circuit components, such as optical switches, couplers, routers, splitters, polarization rotators, multiplexers/demultiplexers, filters, modulators, phase shifters, lasers, amplifiers, wavelength converters, optical-to-electrical (O/E) and electrical-to-optical (E/O) signal converters, etc. A waveguide in a PIC is usually an on-chip solid light conductor that guides light due to an index-of-refraction contrast between the waveguide's core and cladding. A PIC typically comprises a planar substrate on which optical, electrical, and/or optoelectronic devices are grown by an additive manufacturing process and/or into which optoelectronic devices are embedded by a subtractive manufacturing process, e.g., using a suitable sequence of photolithographic and chemical processing steps.

A "major plane" of an object, such as a die, a PIC, a substrate, or an electronic integrated circuit (IC), is a plane parallel to a substantially planar surface thereof that has the largest sizes, e.g., length and width, among all exterior surfaces of the object. This substantially planar surface may also be referred to as a main surface. The feature height variation along the main surface may typically be much smaller than length or width, or both length and width, of said surface. In such cases, such main surface may be referred to as a substantially planar surface. The exterior surfaces of the object that have one relatively large size, e.g., length, and one relatively small size, e.g., height, are typically referred to as the edges of the object.

As used herein, the term "substrate" refers to a circuit or device carrier, a plate, a board, or a base designed and configured to provide structural support to various circuit elements and to support electrical and/or optical connections between different parts thereof to enable proper operation of electrical, optical, and/or optoelectronic components located at, mounted on, or connected to those parts. Such components may include, e.g., different parts of an electronic IC or a PIC fabricated on the substrate or any combination of packaged or non-packaged electronic integrated circuits, photonic integrated circuits, and discrete (e.g., lumped) elements. Electrical connections between different parts of the substrate can be formed, e.g., using patterned electrically conducting (such as metal) layers located within the body or on the surface of the substrate and/or conventional electrical wiring. Optical connections between different optical and/or optoelectronic components on the substrate can be formed using built-in optical waveguides, optical couplers, and/or optical fibers or through free space, e.g., using discrete optical elements mounted on the substrate. In some embodiments, the substrate may have several distinct levels, e.g., comprising a redistribution layer (RDL), an interposer, a laminated plate, and/or a printed circuit board.

In an example embodiment, a substrate can be implemented, e.g., using a silicon layer or base, a SOI wafer, or III-V semiconductor layer or base. Typically, such a substrate has lateral dimensions (e.g., length and width) that are significantly larger than its thickness.

Integrated polarization-handling components of a PIC, such as conventional polarization splitters, combiners, and rotators, may be implemented using on-chip waveguides having one or more slanted sidewalls, i.e., sidewalls that are not orthogonal to the corresponding major plane of the PIC or its substrate. Such slanted sidewalls can be formed, e.g., using anisotropic wet etching, which typically exhibits relatively large process variances and makes batch-to-batch reproducibility difficult to achieve. Since the guided optical modes can be very sensitive to the slant angles and their profile(s) along the longitudinal waveguide direction (i.e., the optical-signal propagation direction), low chip yields may result, which may disadvantageously or even prohibitively increase the cost of the corresponding PICs and of the assemblies and/or devices in which such PICs are used.

At least some of the above-indicated problems in the state of the art can be addressed using PIC-design solutions that rely on laterally tilted waveguide cores, e.g., as disclosed herein. At least some embodiments can advantageously provide reliable polarization handling in a wavelength range between ca. 1.4 μm and 1.7 μm. Particularly beneficial can be the concomitant ability to make the corresponding optical waveguides using standard fabrication processes, e.g., easy-to-control processes that are already in use in many semiconductor foundries. Such processes may advantageously support relatively high chip yields and/or facilitate cost-effective fabrication of PDM-enabled PICs.

Figure 1A:
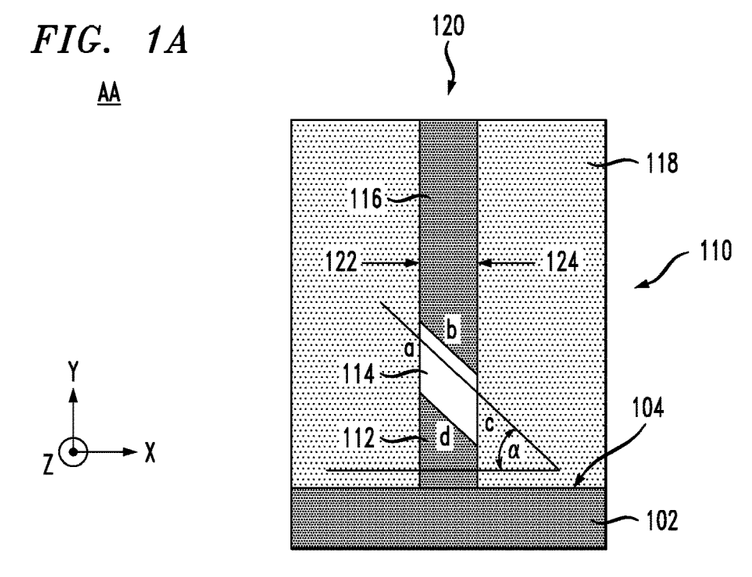
FIGS. 1A-1C show schematic views of different parts of an optical waveguide circuit according to an embodiment.
Figure 1B:
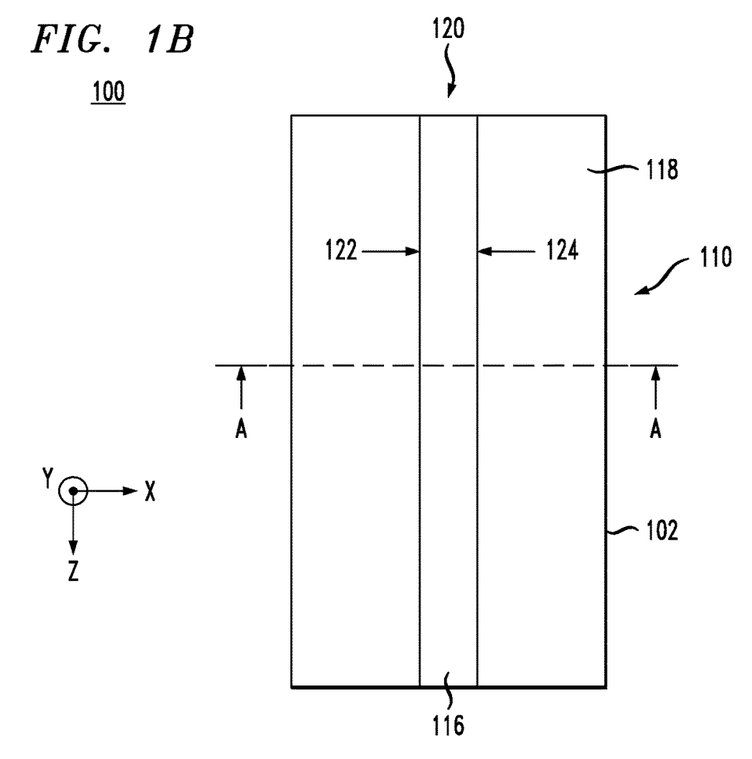
Figure 1C:
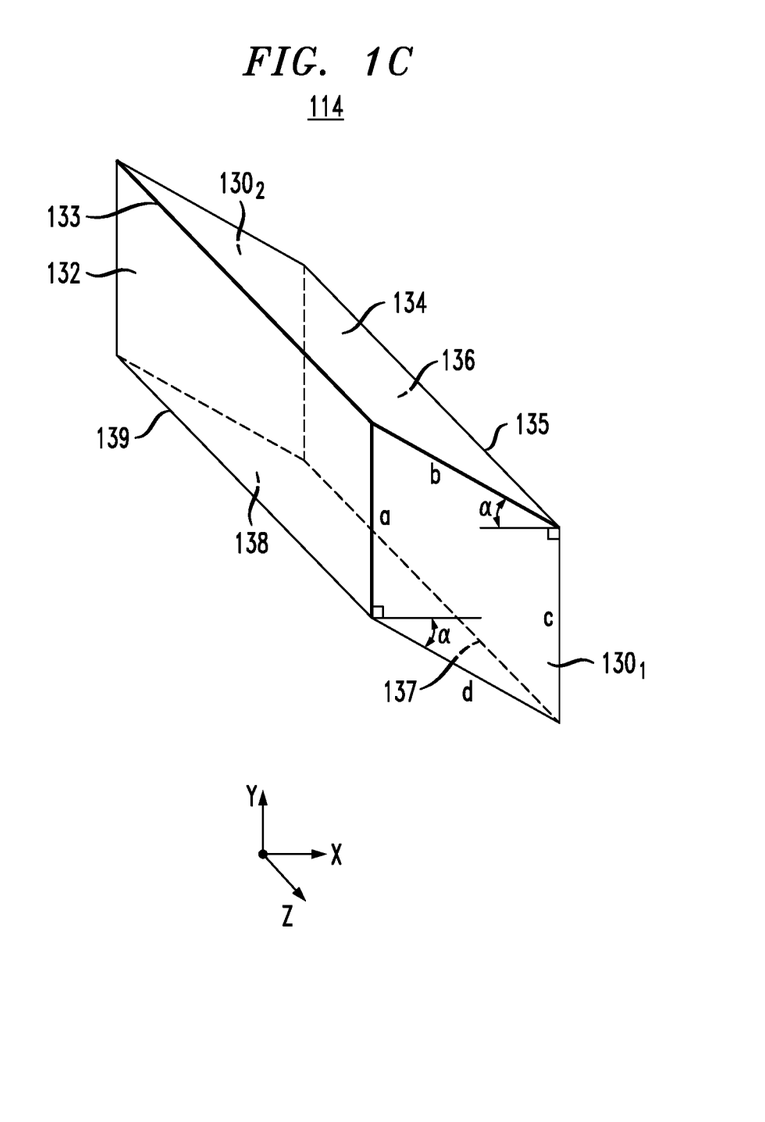

FIGS. 1A-1C show schematic views of different parts of an optical waveguide circuit 100 according to an embodiment. More specifically, FIG. 1B shows a schematic top view of circuit 100. FIG. 1A shows a schematic cross-sectional view of circuit 100 along the planar cross-section AA indicated in FIG. 1B. FIG. 1C shows a three-dimensional perspective view of a waveguide core 114 used in circuit 100. The XYZ-coordinate triad shown in each of FIGS. 1A-1C indicates the relative orientation of the views shown in these figures.

Circuit 100 comprises an optical waveguide 110 formed and supported on a main surface 104 of a substrate 102. In an example embodiment, surface 104 can be a substantially planar surface. Circuit 100 may be a part of a larger PIC (not explicitly shown in FIGS. 1A-1C) formed and/or supported on substrate 102. For illustration purposes, surface 104 is shown in FIGS. 1A-1B as being parallel to the XZ-coordinate plane.

Referring to FIG. 1A, optical waveguide 110 comprises waveguide core 114 and a multi-part waveguide cladding, e.g., 112/116/118. Waveguide core 114 is made of a material whose index of refraction (at the relevant wavelength) is higher than the refractive indices of the materials of any of the cladding parts 112, 116, and 118. This characteristic enables optical waveguide 110 to guide light along the Z-coordinate direction, which may be referred to herein as the longitudinal waveguide direction.

Although example embodiments are described herein below in reference to straight (i.e., linear) waveguide sections, such reference is not intended to be construed in a limiting sense. A person of ordinary skill in the pertinent art will readily understand that the disclosed inventive concepts also apply to curved optical waveguides. For example, for a curved optical waveguide, the orientation of the longitudinal waveguide direction changes along the waveguide curve. A direction locally orthogonal to the longitudinal waveguide direction and parallel to the substrate (e.g., parallel to surface 104) may be referred-to as a lateral waveguide direction. The planar cross-section AA shown in FIG. 1A is parallel to the XY-coordinate plane and is orthogonal to the Z-coordinate axis. In cross-section AA, the lateral waveguide direction is parallel to the X-coordinate axis. For a curved optical waveguide, the orientation of the lateral waveguide direction changes along the waveguide curve in sync with the longitudinal waveguide direction.

The multi-part waveguide cladding of optical waveguide 110 comprises a lower cladding 112, an upper cladding 116, and an encapsulating layer 118. In some embodiments, encapsulating layer 118 may be absent. In such embodiments, a ridge-waveguide structure 120 (which comprises lower cladding 112, waveguide core 114, and upper cladding 116) may be surrounded by air (or other gas or vacuum). In some embodiments, a portion of substrate 102 adjacent to ridge-waveguide structure 120 may also function as a part of the multi-part waveguide cladding (see, e.g., FIGS. 2B-2C).

In an example embodiment, waveguide core 114 may comprise InGaAsP. Substrate 102, lower cladding 112, upper cladding 116, and encapsulating layer 118 may comprise variously doped, identically doped, and/or intrinsic InP.

Ridge-waveguide structure 120 has sidewalls 122 and 124. In an example embodiment, at least one of sidewalls 122 and 124 is substantially (e.g., within ±5 degrees or within ±2 degrees) orthogonal to surface 104 of substrate 102. For illustration purposes, FIG. 1A shows an example in which each of sidewalls 122 and 124 is planar and orthogonal to surface 104. Different planar portions of sidewall 122 correspond to lower cladding 112, waveguide core 114, and upper cladding 116, respectively. Similarly, different planar portions of sidewall 124 correspond to lower cladding 112, waveguide core 114, and upper cladding 116, respectively.

Although ridge-waveguide structure 120 is shown in FIG. 1B as having a constant width (i.e., the size corresponding to the X-coordinate axis), embodiments in which the corresponding ridge-waveguide structure has a varying width are also contemplated.

In cross-section AA, waveguide core 114 has the cross-sectional shape of a parallelogram, whose four sides are labeled a, b, c, and d, respectively. Sides a and c of the parallelogram are parallel to one another and on sidewalls 122 and 124, respectively. As such, sides a and c of the parallelogram are substantially orthogonal to surface 104 of substrate 102. Sides b and d of the parallelogram are parallel to one another and are oriented at a tilt angle $\alpha$ with respect to surface 104. Side b is located at a larger offset distance with respect to (i.e., is farther from) surface 104 than side d. As such, side b can be referred to as being a part of an upper surface of waveguide core 114, and side d can be referred to as being a part of a lower surface of waveguide core 114. In an example embodiment, the tilt angle $\alpha$ can be any nonzero angle, e.g., in the range between 0 degrees and 60 degrees. The tilt angle $\alpha$ can be referred to as a lateral tilt angle because this angle can be used to quantify the tilt of the upper and/or lower surfaces of waveguide core 114 with respect to surface 104.

In some sections of waveguide 110, the lateral tilt angle $\alpha$ of waveguide core 114 may be constant along the longitudinal length of the section. In some other sections of waveguide 110, the lateral tilt angle $\alpha$ of waveguide core 114 may be changing in a continuous manner from a first tilt-angle $\alpha_1$ to a second tilt-angle $\alpha_2$, where $\alpha_1 \neq \alpha_2$. In some embodiments, such change may be adiabatic with respect to the relevant properties of the light guided by waveguide 110. In some embodiments, a section of waveguide 110 may include a juncture in which the value of the lateral tilt angle $\alpha$ changes in a substantially discontinuous (e.g., step-like) manner from a first tilt angle $\alpha_1$ to a second tilt angle $\alpha_2$, where $\alpha_1 \neq \alpha_2$. In some embodiments, a section of waveguide 110 may include a step-like juncture in which an un-tilted section of the waveguide core is connected to a tilted section of the waveguide core, i.e., wherein the effective tilt angle changes from zero to a non-zero value $\alpha$.

FIG. 1C pictorially shows an example three-dimensional shape of waveguide core 114 in a straight waveguide section characterized by a constant lateral tilt angle $\alpha$. In this case, waveguide core 114 has a shape of a polygonal prism, two bases of which, labeled 130₁ and 130₂, are congruent parallelograms. This polygonal prism also has four rectangular lateral faces, labeled 132, 134, 136, and 138, respectively.

Base 130₁ has the previously mentioned four sides a, b, c, and d, which are also shown in FIG. 1A. Lateral face 132 is a part of sidewall 122 (also see FIG. 1A). Lateral face 136 is a part of sidewall 124 (also see FIG. 1A). As such, each of lateral faces 132 and 136 is substantially orthogonal to surface 104 of substrate 102. Lateral faces 134 and 138 represent the above-mentioned upper and lower surfaces, respectively, of waveguide core 114. Each of lateral faces 134 and 138 has a lateral tilt angle $\alpha$ with respect to the XZ-coordinate plane, as indicated in FIG. 1C. As already mentioned above, surface 104 of substrate 102 is parallel to the XZ-coordinate plane.

Lateral faces 132 and 134 are connected to one another at an edge 133 of the polygonal prism. Lateral faces 134 and 136 are connected to one another at an edge 135 of the polygonal prism. Lateral faces 136 and 138 are connected to one another at an edge 137 of the polygonal prism. Lateral faces 132 and 138 are connected to one another at an edge 139 of the polygonal prism.

In the example shown in FIG. 1C, lateral faces 132, 134, 136, and 138 are flat, and edges 133, 135, 137, and 139 are straight. However, for a waveguide section having a continuously variable lateral tilt angle α, the upper and lower surfaces of waveguide core 114 are no longer flat, and the corresponding edges are not straight. For a curved waveguide section, all of the lateral faces of the waveguide core are typically not flat, and the corresponding edges are not straight.

FIGS. 2A-2D show schematic cross-sectional views AA of several alternative embodiments of ridge-waveguide structure 120 (also see FIG. 1A). For added clarity, the optional encapsulating layer 118 is not explicitly shown in any of FIGS. 2A-2D.

Figure 2A:
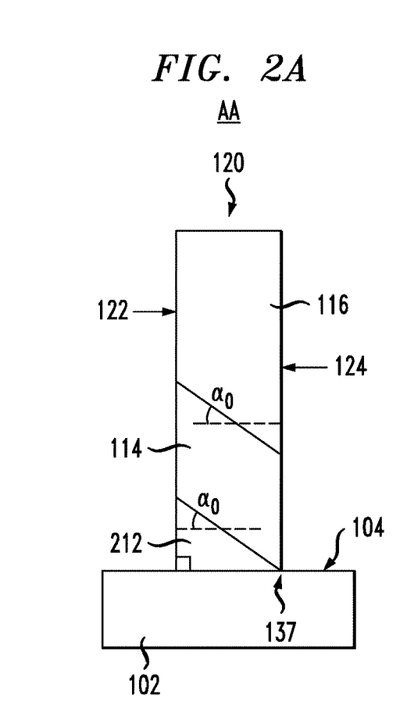
FIGS. 2A-2D show schematic cross-sectional views of ridge-waveguide structures according to several alternative embodiments of the optical waveguide circuit shown in FIGS. 1A-1B.

In the embodiment of FIG. 2A, ridge-waveguide structure 120 comprises a lower cladding 212, waveguide core 114, and upper cladding 116. Lower cladding 212 differs from lower cladding 112 (FIG. 1A) in its cross-sectional shape. More specifically, lower cladding 212 has a triangular cross-sectional shape, whereas lower cladding 112 (FIG. 1A) has a trapezoid cross-sectional shape. In the shown example, the cross-section of lower cladding 212 has the shape of a right-angled triangle, although other triangular shapes are also possible. The triangular cross-sectional shape of lower cladding 212 causes edge 137 of waveguide core 114 to be in direct physical contact with (i.e., be located directly on) surface 104 of substrate 102.

Figure 2B:
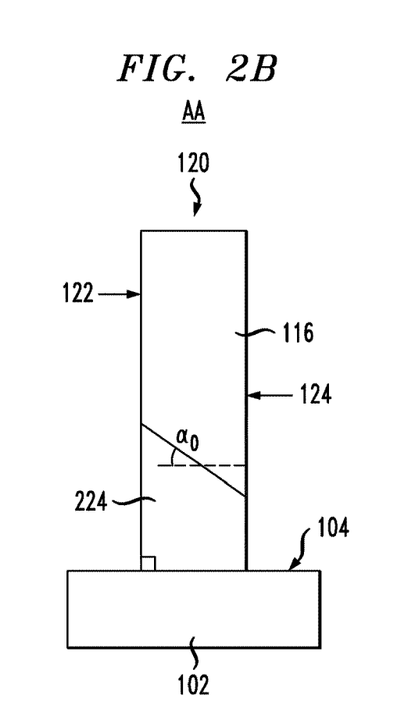

In the embodiment of FIG. 2B, ridge-waveguide structure 120 comprises a waveguide core 224 and upper cladding 116. Lower cladding 112 is not present. Waveguide core 224 differs from waveguide core 114 (FIGS. 1A, 2A) in its cross-sectional shape. More specifically, the cross-sectional shape of waveguide core 224 is a right-angled trapezoid. The bases of the trapezoid are on sidewalls 122 and 124, respectively. One leg of the trapezoid has a zero tilt angle and is in direct physical contact with (i.e., is located on) surface 104 of substrate 102. The other (upper) leg of the trapezoid has a nonzero lateral tilt angle $\alpha_0$. The embodiment of FIG. 2B can be viewed as a modification of the embodiment of FIG. 2A, in which lower cladding 212 (FIG. 2A) is made of the same material as waveguide core 114, thereby extending the waveguide core down to substrate 102 and resulting in waveguide core 224.

Figure 2C:
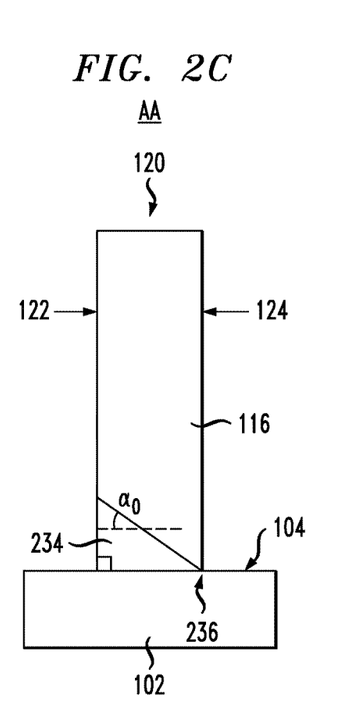

In the embodiment of FIG. 2C, ridge-waveguide structure 120 comprises a waveguide core 234 and upper cladding 116. In this case, lower cladding 112 is similarly not present, and the cross-sectional shape of waveguide core 234 is a right-angled triangle. The lower side of the triangle is parallel to and is in direct physical contact with (i.e., is located on) surface 104 of substrate 102. The upper side of the triangle has a nonzero lateral tilt angle $\alpha_0$. The third side of the triangle is on sidewall 122. The triangular cross-sectional shape of waveguide core 234 causes a lower corner edge 236 of upper cladding 116 to be in direct physical contact with (i.e., be located on) surface 104 of substrate 102.

Figure 2D:
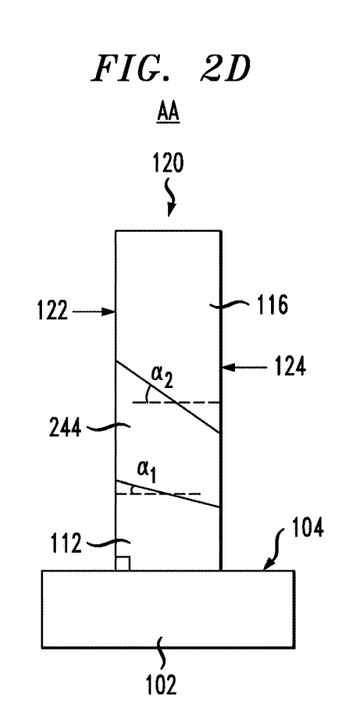

In the embodiment of FIG. 2D, ridge-waveguide structure 120 comprises lower cladding 112, a waveguide core 244, and upper cladding 116. In this case, the cross-sectional shape of waveguide core 244 is an obtuse trapezoid. The bases of the trapezoid are on sidewalls 122 and 124, respectively. One (i.e., the lower) leg of the trapezoid has a first nonzero lateral tilt angle $\alpha_1$. The other (upper) leg of the trapezoid has a second nonzero lateral tilt angle $\alpha_2$, where $\alpha_1 < \alpha_2$.

Figure 3A:
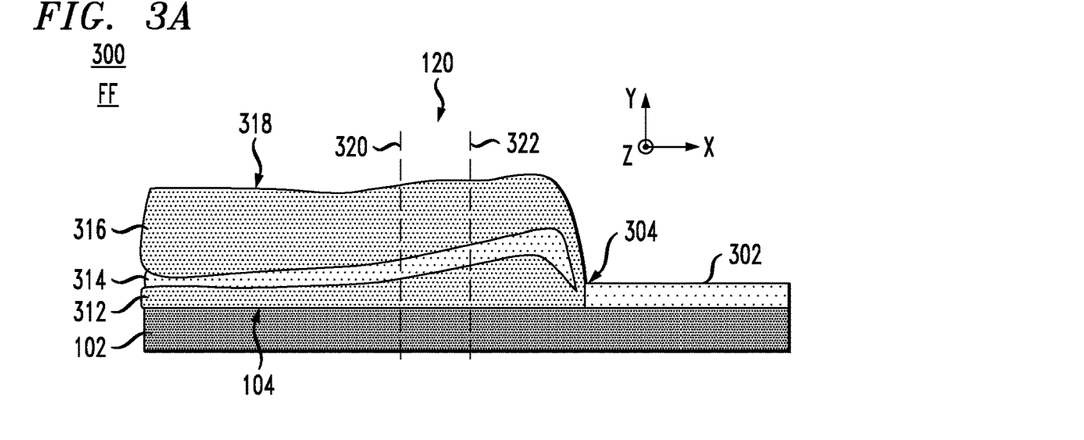
FIG. 3A pictorially illustrates an example manufacturing process that can be used to make the optical waveguide circuit of FIGS. 1A-1C according to an embodiment.

FIG. 3A shows a simplified cross-sectional side view of a layered structure 300 that can be used in the process of manufacturing optical waveguide circuit 100 (FIGS. 1A-1C) according to an embodiment. The XYZ-coordinate triad shown in FIG. 3A represents the same coordinate system as that shown in FIGS. 1A-1C. Some additional layers (such as etch-stop layers, buffer layers, and other technological layers known to persons of ordinary skill in the pertinent art) that may be present in some embodiments of layered structure 300 are not explicitly shown in FIG. 3A for clarity of depiction.

Layered structure 300 comprises substrate 102, a dielectric mask 302, and semiconductor layers 312, 314, and 316. In an example embodiment, substrate 102, layer 312, and layer 316 may be made of differently doped InP. Layer 314 may be made of InGaAsP.

To arrive at optical waveguide circuit 100 starting from a bare substrate 102, the following example manufacturing steps corresponding to layered structure 300 may be used:

(i) A planar dielectric mask 302 of appropriately chosen thickness and in-plane shape is formed on surface 104 of substrate 102, e.g., using lithography;

(ii) Selective Area Growth (SAG) epitaxy is then used to sequentially deposit semiconductor layers 312, 314, and 316. Under certain known conditions, SAG epitaxy may exhibit an increased growth rate in the proximity of a dielectric mask, such as mask 302. More specifically, the epitaxial growth rate depends on the distance from the proximal edge of the dielectric mask, such as an edge 304 of mask 302, and is typically higher near the mask. The growth-rate gradient can be controlled by adjusting the conditions under which the epitaxial growth is carried out, e.g., as known to persons of ordinary skill in the pertinent art. The thickness profiles of semiconductor layers 312, 314, and 316 shown in FIG. 3A represent just one example of a layer-stack geometry that can be produced using such control. For example, a layer stack having a different (from three) number of semiconductor layers therein can similarly be produced. In general, SAG epitaxy is known to be well controllable and highly reproducible, which is beneficial, e.g., for achieving an acceptably high yield of the corresponding PICs during manufacture;

(iii) A top surface 318 of semiconductors layer 316 is subjected to chemical mechanical polishing (CMP) to produce a flat top surface, e.g., parallel to surface 104 of substrate 102. Patterning and etching is then used, as known in the pertinent art, to remove the unwanted material outside the "corridor" between dashed lines 320 and 322, down to surface 104. The remaining portions of semiconductor layers 312, 314, and 316 within such corridor produce the ridge-waveguide structure 120 of FIG. 1A;

(iv) Optional encapsulating layer 118 may then be deposited over the ridge-waveguide structure 120 obtained at step (iii) to produce the optical waveguide circuit 100 of FIGS. 1A-1C.

From the example shown in FIG. 3A, a person of ordinary skill in the art will understand that different lateral tilt angles α can be obtained by moving the corridor 320-322 closer to edge 304 of mask 302 or farther from said edge of the mask. A continuously changing lateral tilt angle α can be obtained, e.g., by using a continuously curved mask 302 oriented such that different parts of the corridor 320-322 are located at different respective distances from the curved edge 304 of the mask. In such cases, the in-plane shape of edge 304 determines the tilt-angle gradient along the longitudinal waveguide direction. Transitions characterized by abrupt (e.g., substantially discontinuous) changes of the lateral tilt angle α can be obtained, e.g., by using a dielectric mask 302 whose edge 304 has an appropriately oriented zigzag shape in the plane of surface 104.

Figure 3B:
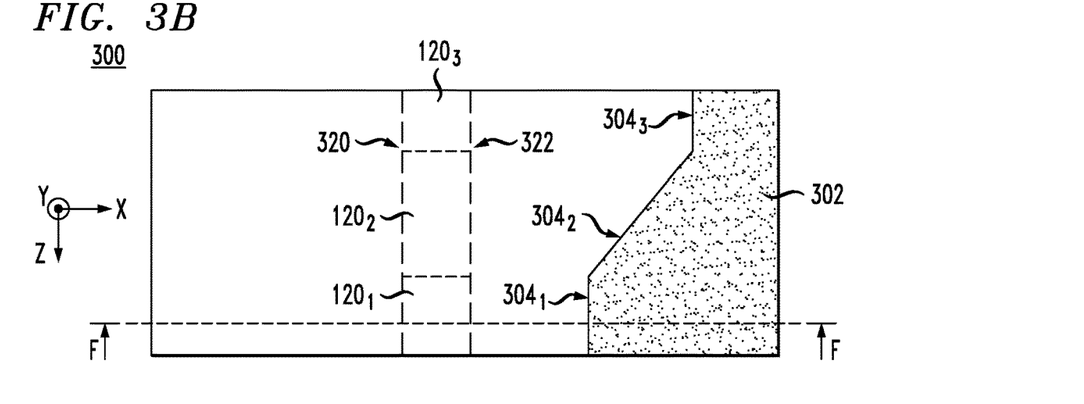
FIGS. 3B-3C schematically show in-plane layouts of a dielectric mask that can be used in some embodiments of the example manufacturing process corresponding to FIG. 3A.
Figure 3C:
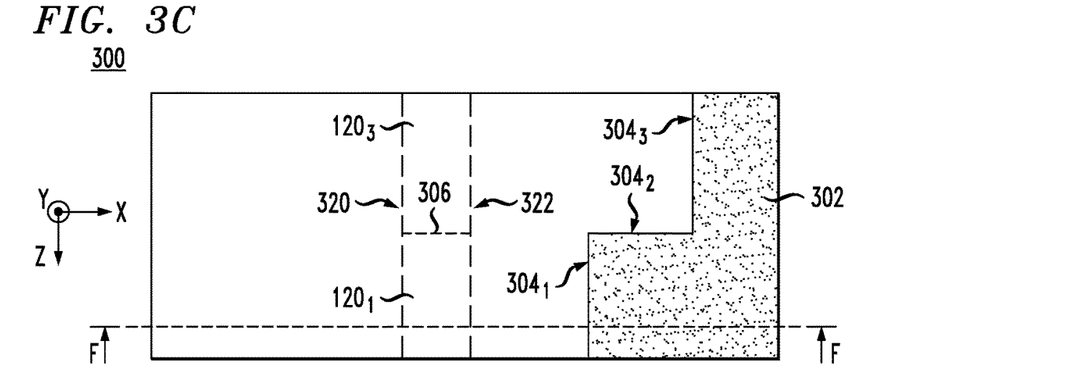

FIGS. 3B-3C schematically show two example in-plane layouts of mask 302 that can be used in some embodiments of the example manufacturing process described above in reference to FIG. 3A. More specifically, the cross-sectional view of FIG. 3A corresponds to the cross-sectional plane FF shown in each of FIGS. 3B and 3C. The XYZ coordinate triads shown in FIGS. 3B and 3C represent the same coordinate system as that shown in FIG. 3A.

In the example of FIG. 3B, edge 304 of mask 302 comprises three linear segments, labeled $304_1$, $304_2$, and $304_3$, respectively. Segments $304_1$ and $304_3$ are parallel to the boundaries 320 and 322 of the nascent ridge-waveguide structure 120. Segment $304_1$ is closer to the boundary 322 than segment $304_3$. Segment $304_2$ is not orthogonal to the boundary 322 and connects the corresponding ends of segments $304_1$ and $304_3$ as indicated in FIG. 3B.

With this mask layout, the ridge-waveguide structure 120, which is formed after the above-described manufacturing step (iii), has three sections, labeled $120_1$, $120_2$, and $120_3$, respectively. Within section $120_1$, the lateral tilt angle α is substantially constant and has a first value, e.g., $α=α_1$. Within section $120_3$, the lateral tilt angle α is also substantially constant and has a second value, e.g., $α=α_3$, where $α_3<α_1$. Along section $120_2$, the lateral tilt angle α changes gradually from the first value to the second value.

In the example of FIG. 3C, segment $304_2$ is orthogonal to the boundary 322. With this particular mask layout, section $120_2$ is not present in the corresponding ridge-waveguide structure 120. Rather, in a narrow vicinity of the juncture 306 between sections $120_1$ and $120_3$, the value of the lateral tilt angle α changes relatively sharply from the first tilt angle value $α_1$ to the second tilt angle value $α_3$.

Figure 4:
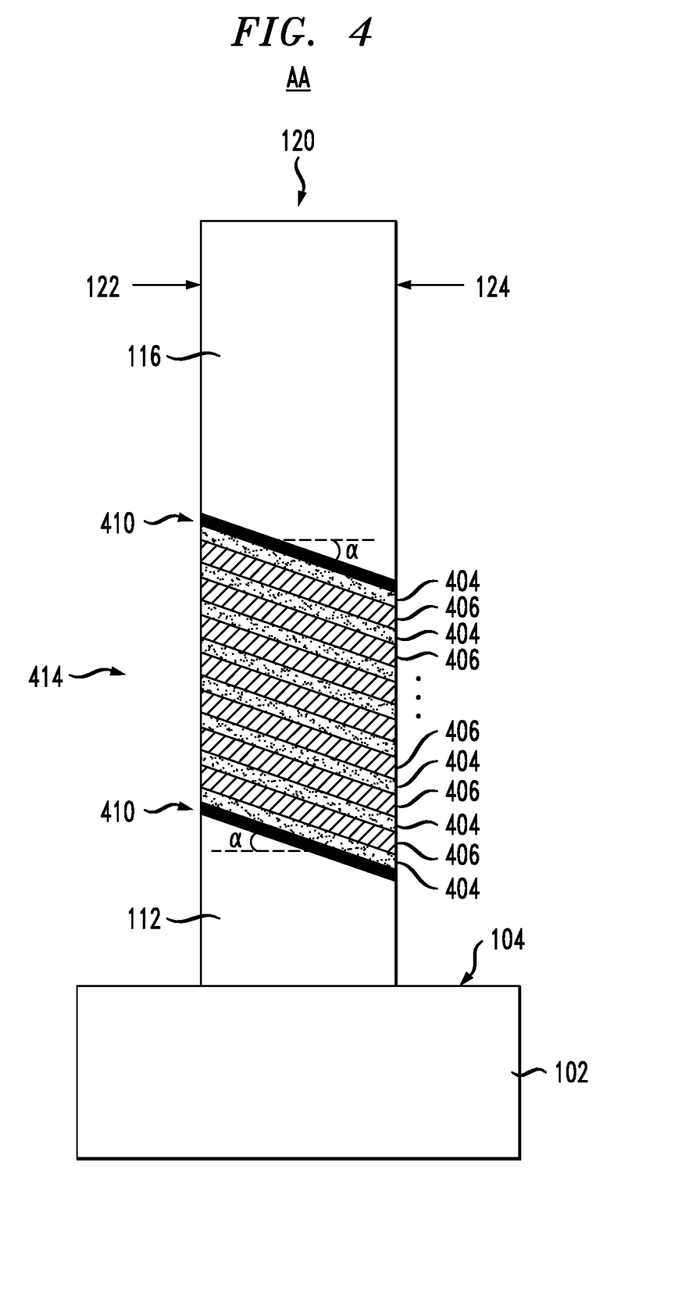
FIG. 4 shows a schematic cross-sectional view of a ridge-waveguide structure according to yet another embodiment of the optical waveguide circuit shown in FIGS. 1A-1B.

FIG. 4 shows a schematic cross-sectional view AA of ridge-waveguide structure 120 (FIG. 1A) according to yet another embodiment. In the embodiment of FIG. 4, ridge-waveguide structure 120 comprises lower cladding 112, a waveguide core 414, and upper cladding 116. Waveguide core 414 functionally differs from the above-described waveguide cores, e.g., 114 (FIG. 1A), in that waveguide core 414 can be configured to function as an active optical element, whereas the other above-described waveguide cores are typically configured to function as passive optical element.

As used herein, the term "passive optical component or element" refers to an optical component or element that does not require external electrical power to operate. Most passive optical components/elements do not generate new light, and simply handle in a predetermined manner the externally generated light applied thereto. Representative examples of passive optical components and elements include, but are not limited to optical connectors and fixed signal splitters, attenuators, isolators, couplers, filters, etc.

In contrast, the term "active optical component or element" refers to an optical component or element designed to be controllable and/or operable using an external electrical (e.g., control, power, or pump) signal. Some active optical components and elements can generate new light. Some other active optical components and elements can variably and controllably attenuate light in response to an external electrical signal. Representative examples of active optical components and elements include, but are not limited to semiconductor lasers, semiconductor optical amplifiers, electro-absorption modulators, etc.

Waveguide core 414 comprises a stack of relatively thin, laterally tilted semiconductor layers. In an example embodiment, both the upper surface and the lower surface of waveguide core 414 may have the same lateral tilt angle α, e.g., as indicated in FIG. 4. The stack of layers comprises a multiple-quantum-well (MQW) structure formed by alternating relatively thin layers 404 and 406 made of different respective semiconductor materials. In some embodiments, the semiconductor materials of layers 404 and 406 may be intrinsic semiconductors. Lower cladding 112 and upper cladding 116 may be made of n-doped and p-doped semiconductor materials, respectively.

In an example embodiment, the following semiconductor materials can be used to implement layers 404-406: (i) In(x)Ga(1-x)As for layers 404; and (ii) In(x)Al(1-x)As for layers 406. In alternative embodiments, other semiconductor materials and/or dopants can similarly be used.

Lower cladding 112 and upper cladding 116 and the alternating layers 404/406 therebetween form a p-i-n diode (also sometimes referred to as a "PIN diode") that can be electrically biased using electrodes (not explicitly shown in FIG. 4) connected to lower cladding 112 and upper cladding 116. In operation, such electrodes may be electrically connected to apply to the PIN diode an appropriate dc bias or a combination of the dc bias and a radio-frequency (RF) signal. In different electrical configurations of the PIN diode, the dc bias can be a reverse bias or a forward bias.

As used herein, the term "reverse bias" refers to an electrical configuration of a semiconductor-junction diode in which the n-type material is at a high electrical potential, and the p-type material is at a low electrical potential. The reverse bias typically causes the depletion layer to grow wider due to a lack of electrons and/or holes, which presents a high impedance path across the junction and substantially prevents a current flow therethrough. However, a very small reverse leakage current can still flow through the junction in the reverse-bias configuration.

Similarly, the term "forward bias" refers to an electrical configuration of a semiconductor-junction diode in which the n-type material is at a low potential, and the p-type material is at a high potential. If the forward bias is greater than the intrinsic voltage drop $V_{pn}$ across the corresponding p-i-n junction, then the corresponding potential barrier can be overcome by the electrical carriers, and a relatively large forward current can flow through the junction. For example, for silicon-based diodes the value of $V_{pn}$ is approximately 0.7 V. For germanium-based diodes, the value of $V_{pn}$ is approximately 0.3 V, etc.

In some embodiments, waveguide core 414 may also comprise optional confinement heterostructures 410 at the upper and lower sides thereof, e.g., as indicated in FIG. 4. Such confinement heterostructures 410 may be used to better confine light in the above-described MQW structure, e.g., to improve efficiency thereof.

In various alternative embodiments of ridge-waveguide structure 120, MQW structures based on other, e.g., more complex layer stacks and/or doping profiles, can be realized as well. For example, n-i-n or n-i-p-n semiconductor structures may be implemented in some of such alternative embodiments.

Figure 5A:
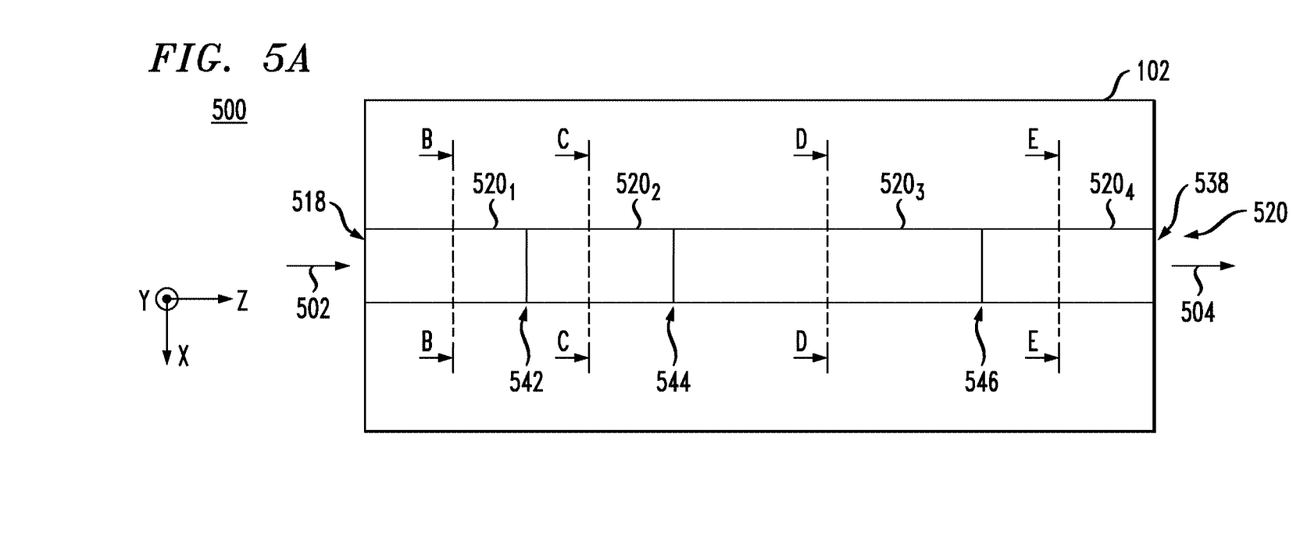
FIGS. 5A-5D show schematic views of an optical waveguide circuit according to another embodiment.
Figure 5B:
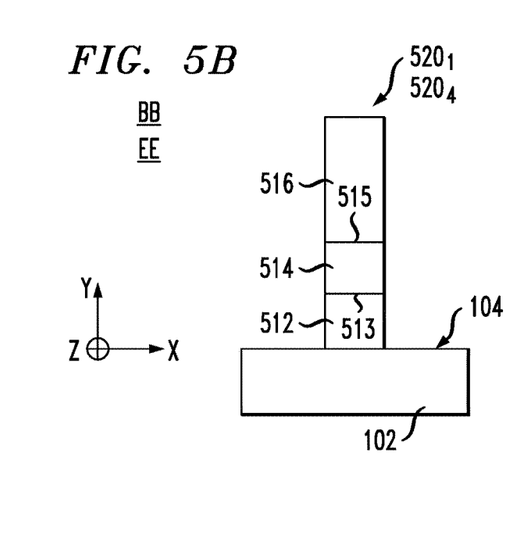
Figure 5C:
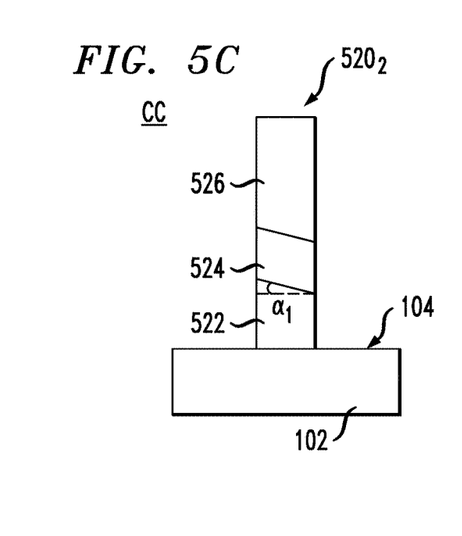
Figure 5D:
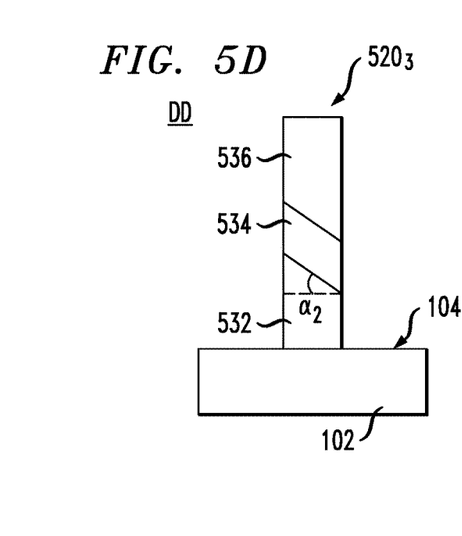

FIGS. 5A-5D show schematic views of an optical waveguide circuit 500 according to another embodiment. More specifically, FIG. 5A shows a schematic top view of circuit 500. FIG. 5B shows a schematic cross-sectional view of circuit 500 along the planar cross-section BB or EE indicated in FIG. 5A. FIG. 5C shows a schematic cross-sectional view of circuit 500 along the planar cross-section CC indicated in FIG. 5A. FIG. 5D shows a schematic cross-sectional view of circuit 500 along the planar cross-section DD indicated in FIG. 5A. The XYZ-coordinate triad shown in FIGS. 5A and 5B indicates the relative orientation of the views shown in these two figures. The views shown in FIGS. 5C and 5D have the same orientation as the view of FIG. 5B.

Circuit 500 comprises a ridge-waveguide structure 520 formed and supported on main surface 104 of substrate 102. Ridge-waveguide structure 520 is generally similar to ridge-waveguide structure 120 but has four different waveguide sections labeled $520_1$, $520_2$, $520_3$, and $520_4$, respectively. In operation, an optical input signal 502 applied to an end 518 of waveguide section $520_1$ sequentially traverses waveguide sections $520_1$, $520_2$, $520_3$, and $520_4$ and comes out an end 538 of the latter waveguide section as an optical output signal 504. Optical signals 502 and 504 may differ from one another in their polarization state, e.g., as explained in more detail below.

Referring to FIG. 5B, waveguide section $520_1$ comprises a lower cladding 512, a waveguide core 514, and an upper cladding 516. Waveguide core 514 may be referred to as being untilted or flat. More specifically, each of lower cladding 512, waveguide core 514, and upper cladding 516 has a respective rectangular cross-sectional shape. As a result, both a lower surface 513 and an upper surface 515 of waveguide core 514 are planar and parallel to surface 104 of substrate 102. This orientation of surfaces 513 and 515 can also be described as corresponding to a zero lateral tilt angle $\alpha$, i.e., $\alpha=0$. Waveguide core 514 is untilted along the entire longitudinal length of waveguide section $520_1$.

Waveguide section $520_4$ has the same structure as waveguide section $520_1$. As such, FIG. 5B represents both the cross-section BB of waveguide section $520_1$ and the cross-section EE of waveguide section $520_4$.

Referring to FIG. 5C, waveguide section $520_2$ comprises a lower cladding 522, a waveguide core 524, and an upper cladding 526. The lateral tilt angle $\alpha$ of waveguide core 514 changes in a continuous manner along the longitudinal direction of waveguide section $520_2$ from a zero value (i.e., $\alpha=0$) at a junction 542 between waveguide sections $520_1$ and $520_2$ to a nonzero tilt angle $\alpha_2$ at a junction 544 between waveguide sections $520_2$ and $520_3$. As a result, the cross-sectional shape of waveguide core 524 changes from being a rectangle at junction 542 to being a parallelogram at junction 544. In the cross-sectional plane CC, which is located in a middle longitudinal part of waveguide section $520_2$, waveguide core 524 has a nonzero lateral tilt angle $\alpha_1$, where $0<\alpha_1<\alpha_2$.

Referring to FIG. 5D, waveguide section $520_3$ comprises a lower cladding 532, a waveguide core 534, and an upper cladding 536. The lateral tilt angle $\alpha$ of waveguide core 534 is constant along the entire longitudinal length of waveguide section $520_3$. The cross-sectional shape of waveguide core 534 is a fixed parallelogram, which is shown in FIG. 5D. At a junction 546 between waveguide sections $520_3$ and $520_4$, the cross-sectional shape of the waveguide core changes in an abrupt manner from being a parallelogram (as shown in FIG. 5D) to being a rectangle (as shown in FIG. 5B).

In an example embodiment, circuit 500 can function as a polarization splitter-rotator. For example, let us assume that optical input signal 502 has a TE polarization. Herein, the TE polarization of light in circuit 500 has the electric field oriented substantially along the Y-coordinate axis. In contrast, the TM polarization of light in circuit 500 has the electric field oriented substantially along the X-coordinate axis.

Optical input signal 502 may couple into one or more TE-polarized eigenmodes of waveguide section $520_1$. Waveguide section $520_1$ then guides the resulting coupled TE-polarized optical signal to junction 542 and applies said signal threat to waveguide section $520_2$. The gradual change of the lateral tilt angle $\alpha$ of waveguide core 524 along the longitudinal waveguide direction in waveguide section $520_2$ causes the corresponding optical signal at junction 544 to be in a hybrid polarization mode. Herein, the term "hybrid polarization mode" refers to a guided mode in which light of both TE and TM polarizations is present.

In an example embodiment, waveguide section $520_3$ may support two or more hybrid polarization modes. Depending on the implementation specifics of waveguide sections $520_2$ and $520_3$, a single one of such hybrid polarization modes or more than one of such hybrid polarization modes may be populated at junction 546. From junction 546, the output hybrid polarization mode(s) of waveguide section $520_3$ may be coupled into waveguide section $520_4$ as a linear combination of TE and TM eigenmodes therein. Waveguide section $520_4$ then outputs said linear combination of TE and TM eigenmodes at end 538 thereof as optical output signal 504, which may be further directed to downstream circuits of the corresponding PIC.

The power ratio of TE- and TM-polarized light in optical output signal 504 typically depends on the implementation specifics of circuit 500. For example, various parameters of waveguide sections $520_1$, $520_2$, $520_3$, and $520_4$ may be selected such that a 50/50 power ratio between TE- and TM-polarized light in optical output signal 504 is produced in response to a TE-polarized optical input signal 502. Such an embodiment of circuit 500 thus functions as a 3-dB polarization splitter-rotator. A person of ordinary skill in the art will understand that other embodiments of circuit 500 may be constructed to produce other TE/TM power ratios and/or to operate on differently polarized optical input signals 502.

In some embodiments of circuit 500, waveguide section $520_3$ may be absent.

According to an example embodiment disclosed above, e.g., in the summary section and/or in reference to any one or any combination of some or all of FIGS. 1A-5D, provided is an apparatus, comprising a photonic integrated circuit that comprises: a substrate (e.g., 102, FIG. 1A) having a substantially planar main surface (e.g., 104, FIG. 1A); and an optical waveguide (e.g., 110, FIG. 1A) attached to the substrate adjacent and along said main surface, the optical waveguide including a waveguide core (e.g., 114, FIG. 1A); and wherein a first section of the waveguide core has a first edge (e.g., 133, FIG. 1C) whereat first and second surfaces (e.g., 132, 134, FIG. 1C) of the waveguide core are connected to one another, the first surface being substantially orthogonal to said main surface, the second surface having a nonzero lateral tilt angle (e.g., $\alpha$, FIG. 1C) with respect to said main surface.

In some embodiments of the above apparatus, the nonzero lateral tilt angle changes continuously along a longitudinal waveguide direction of the first section between a first nonzero tilt-angle value (e.g., $\alpha_1$, FIG. 5C) and a different second nonzero tilt-angle value (e.g., $\alpha_2$, FIG. 5D).

In some embodiments of any of the above apparatus, the nonzero lateral tilt angle is greater than 5 degrees but smaller than 60 degrees.

In some embodiments of any of the above apparatus, the first section of the waveguide core has a second edge (e.g., 139, FIG. 1C) whereat the first surface and a third surface (e.g., 138, FIG. 1C) of the waveguide core are connected to one another, the third surface having the nonzero lateral tilt angle (e.g., α, FIG. 1C) with respect to said main surface.

In some embodiments of any of the above apparatus, the second edge is closer to said main surface than the first edge.

In some embodiments of any of the above apparatus, the first section of the waveguide core has a second edge whereat the first surface and a third surface (e.g., lower surface of 244, FIG. 2D) of the waveguide core are connected to one another, the third surface having a smaller nonzero lateral tilt angle with respect to said main surface than the second surface (e.g., $\alpha_1 < \alpha_2$, FIG. 2D).

In some embodiments of any of the above apparatus, the first section of the waveguide core has a second edge whereat the first surface and a third surface (e.g., lower surface of 224, FIG. 2B) of the waveguide core are connected to one another, the third surface being parallel to said main surface.

In some embodiments of any of the above apparatus, the first section of the waveguide core comprises a semiconductor diode (e.g., 414, FIG. 4).

In some embodiments of any of the above apparatus, the first section of the waveguide core comprises a multiple-quantum-well structure having a plurality of semiconductor layers (e.g., 404, 406, FIG. 4), at least some of said semiconductor layers being parallel to the second surface.

In some embodiments of any of the above apparatus, a second section of the waveguide core is untilted with respect to said main surface, the first and second sections of the waveguide core being end-connected to one another (e.g., $520_3/520_4$ at 546, FIG. 5A).

In some embodiments of any of the above apparatus, the photonic integrated circuit comprises a polarization splitter-rotator (e.g., 500, FIG. 5A) that includes the first and second sections of the waveguide core.

In some embodiments of any of the above apparatus, a second section of the waveguide core has a different nonzero lateral tilt angle, the first and second sections of the waveguide core being end-connected to one another (e.g., $520_2/520_3$ at 544, FIG. 5A).

In some embodiments of any of the above apparatus, a third section of the waveguide core is untilted with respect to said main surface, the second and third sections of the waveguide core being end-connected to one another (e.g., $520_3/520_4$ at 546, FIG. 5A).

In some embodiments of any of the above apparatus, a third section of the waveguide core is untilted with respect to said main surface, the first and third sections of the waveguide core being end-connected to one another (e.g., $520_2/520_1$ at 542, FIG. 5A).

In some embodiments of any of the above apparatus, the photonic integrated circuit comprises a polarization splitter-rotator (e.g., 500, FIG. 5A) that includes the first, second, and third sections of the waveguide core.

In some embodiments of any of the above apparatus, the optical waveguide comprises a ridge-waveguide structure (e.g., 120, FIG. 1A) attached to the substrate adjacent and along said main surface, the ridge-waveguide structure having first and second sidewalls (e.g., 122, 124, FIG. 1A) substantially orthogonal to said main surface, the first sidewall including the first surface.

In some embodiments of any of the above apparatus, the ridge-waveguide structure includes at least a portion of a waveguide cladding, said portion (e.g., part of 116, FIG. 1A) being farther from said main surface than the first section of the waveguide core.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three dimensional structure as shown in the figures. Such "height" would be vertical where the layers are horizontal but would be horizontal where the layers are vertical, and so on. Similarly, while all figures show the substrates as being horizontal, such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus, comprising a photonic integrated circuit that comprises:
   a substrate having a substantially planar main surface; and
   an optical waveguide attached to the substrate adjacent and along said main surface, the optical waveguide including a waveguide core, wherein:
      a first section of the waveguide core has a first edge whereat first and second surfaces of the waveguide core are connected to one another, the first surface being substantially orthogonal to said main surface, the second surface having a first nonzero lateral tilt angle with respect to said main surface; and
      the first section of the waveguide core has a second edge whereat the first surface and a third surface of the waveguide core are connected to one another, wherein:
         (i) the optical waveguide has a lower cladding between the first section of the waveguide core and the substrate, and the third surface has a second nonzero lateral tilt angle with respect to said main surface; or
         (ii) the optical waveguide has no lower cladding between the first section of the waveguide core and the substrate, and the third surface is parallel to said main surface.

2. The apparatus of claim 1, wherein the nonzero lateral tilt angle changes continuously along a longitudinal waveguide direction of the first section between the first nonzero tilt-angle value and a different nonzero tilt-angle value.

3. The apparatus of claim 1, wherein the first nonzero lateral tilt angle is greater than 5 degrees but smaller than 60 degrees.

4. The apparatus of claim 1, wherein:
   the optical waveguide has the lower cladding between the first section of the waveguide core and the substrate; and
   the second nonzero lateral tilt angle is the same as the first nonzero lateral tilt angle.

5. The apparatus of claim 1, wherein:
   the optical waveguide has the lower cladding between the first section of the waveguide core and the substrate; and
   the second nonzero lateral tilt angle is smaller than the first nonzero lateral tilt angle.

6. The apparatus of claim 1, wherein:
   the optical waveguide has no lower cladding between the first section of the waveguide core and the substrate; and
   the third surface is parallel to said main surface.

7. The apparatus of claim 1, wherein the first section of the waveguide core comprises a semiconductor diode.

8. The apparatus of claim 1, wherein the first section of the waveguide core comprises a multiple-quantum-well structure having a plurality of semiconductor layers, at least some of said semiconductor layers being parallel to the second surface.

9. The apparatus of claim 1, wherein a second section of the waveguide core is untilted with respect to said main surface, the first and second sections of the waveguide core being end-connected to one another.

10. The apparatus of claim 9, wherein the photonic integrated circuit comprises a polarization splitter-rotator that includes the first and second sections of the waveguide core.

11. The apparatus of claim 1, wherein a second section of the waveguide core has a different nonzero lateral tilt angle, the first and second sections of the waveguide core being end-connected to one another.

12. The apparatus of claim 11, wherein a third section of the waveguide core is untilted with respect to said main surface, the second and third sections of the waveguide core being end-connected to one another.

13. The apparatus of claim 11, wherein a third section of the waveguide core is untilted with respect to said main surface, the first and third sections of the waveguide core being end-connected to one another.

14. The apparatus of claim 13, wherein the photonic integrated circuit comprises a polarization splitter-rotator that includes the first, second, and third sections of the waveguide core.

15. The apparatus of claim 1,
   wherein the optical waveguide comprises a ridge-waveguide structure attached to the substrate adjacent and along said main surface, the ridge-waveguide structure having first and second sidewalls substantially orthogonal to said main surface, the first sidewall including the first surface; and wherein the ridge-waveguide structure includes at least a portion of a waveguide cladding, said portion being farther from said main surface than the first section of the waveguide core.

16. The apparatus of claim 1, wherein the waveguide core has a trapezoid cross-sectional shape.

17. The apparatus of claim 1, wherein the waveguide core has a triangle cross-sectional shape.

18. An apparatus, comprising a photonic integrated circuit that comprises:

a substrate having a substantially planar main surface; and an optical waveguide attached to the substrate adjacent and along said main surface, the optical waveguide including a waveguide core, wherein:

a first section of the waveguide core has a first edge whereat first and second surfaces of the waveguide core are connected to one another, the first surface being substantially orthogonal to said main surface, the second surface having a nonzero lateral tilt angle with respect to said main surface; and the first section of the waveguide core comprises a multiple-quantum-well structure having a plurality of semiconductor layers, at least some of said semiconductor layers being parallel to the second surface.

19. An apparatus, comprising a photonic integrated circuit that comprises:

a substrate having a substantially planar main surface; and an optical waveguide attached to the substrate adjacent and along said main surface, the optical waveguide including a waveguide core, wherein:

a first section of the waveguide core has a first edge whereat first and second surfaces of the waveguide core are connected to one another, the first surface being substantially orthogonal to said main surface, the second surface having a nonzero lateral tilt angle with respect to said main surface a second section of the waveguide core has a different nonzero lateral tilt angle, the first and second sections of the waveguide core being end-connected to one another; and a third section of the waveguide core is untilted with respect to said main surface, the first and third sections of the waveguide core being end-connected to one another.

20. The apparatus of claim 19, wherein the photonic integrated circuit comprises a polarization splitter-rotator that includes the first, second, and third sections of the waveguide core.

* * * * *